United States Patent [19]

Savarick

[11] 4,221,481
[45] Sep. 9, 1980

[54] PHOTOGRAPHIC PRINTER

[75] Inventor: Alan Savarick, Rockville Centre, N.Y.

[73] Assignee: Beacon Photo Service, Inc., Rockville Centre, N.Y.

[21] Appl. No.: 51,536

[22] Filed: Jun. 25, 1979

[51] Int. Cl.³ ............................................. G03B 27/58
[52] U.S. Cl. ...................................... 355/72; 355/27
[58] Field of Search ........................ 355/72, 27, 97, 99

[56] References Cited

U.S. PATENT DOCUMENTS

| | | | |
|---|---|---|---|
| 4,035,076 | 7/1977 | Götze et al. | 355/72 |
| 4,147,427 | 4/1979 | Stewart | 355/72 |
| 4,161,364 | 7/1979 | Hanai et al. | 355/72 |
| 4,166,588 | 9/1979 | Krehbiel et al. | 355/72 X |

FOREIGN PATENT DOCUMENTS 2540610  3/1977  Fed. Rep. of Germany ............. 355/72

*Primary Examiner*—Richard A. Wintercorn
*Attorney, Agent, or Firm*—Bauer & Amer

[57] ABSTRACT

The feed of a continuous strip of light-sensitive paper to a high speed printer, of known construction and operating mode, is made from a large-sized spool, independently supported in a dark room and fed through a tunnel-like enclosure to the printer, thus obviating the current practice of having to replace this component, now typically consumed approximately every ten minutes of operation and usually requiring a ten minute down-time period to effectuate the replacement, at such frequency as to almost neutralize the advantage of the high speed of operation of the printer.

4 Claims, 3 Drawing Figures

PHOTOGRAPHIC PRINTER

The present invention relates generally to improvements for high speed photographic printers, such as those referenced in U.S. Pat. No. 4,147,427, and more particularly to more efficient and effective handling of the feed of light-sensitive or development paper consumed in the printing of such devices.

Numerous models of photographic printers, such as the Pako Mach II, Kodak 2610, and Agfa 7560, can print at speeds capable of consuming a 500 meter long strip of development paper in ten minutes. The inconvenience attending the need to frequently supplement the paper supply has not been solved by increasing said 500 meter supply length because current prior art practice dictates that the paper roll be housed in a cartridge that is attached to the printer, and thus a length significantly longer than 500 meters is undoubtedly believed to be too heavy and difficult to manage as part of an attachable cartridge. Efforts of the prior art have therefore been directed to improving the paper supply spool cartridge and the techniques by which it is attached to the printer in order to minimize the referred to down-time and other operating parameters which detract from the primary efficiency of the device in producing photographic work product.

Broadly, it is an object of the present invention to significantly improve paper feed to a high speed photographic printer, thereby overcoming the foregoing and other shortcomings of the prior art associated with this specific operational aspect of such equipment. Specifically, it is an object to make provision for the effective handling of a paper supply roll having a starting diameter as large as perhaps 54 inches, thus significantly exceeding 500 meters, to thereby drastically reduce downtime to when the photographic film strip spool must be replaced rather than, as is characterizing of the prior art, when the development paper supply is exhausted. Since a photographic original or negative is typically used to make numerous copies on the photosensitive print medium or development paper, feed control of the paper has by far the more significant impact on the productive capacity of the printer, and thus the providing of this feed control in the effective manner as subsequently disclosed herein is a noteworthy contribution.

Intended, as already noted, for a photographic printer of the type using light-sensitive development paper, improvements in the operation and operating environment of such printer demonstrating objects and advantages of the present invention are those that are specifically effective to minimize non-operating periods of such printer as are now allowed for replenishment of the supply of the development paper. More particularly, the improvements include wall means bounding a light-controlled room and an operative location for the photographic printer that is in proximate external relation to the room. A hollow tunnel-like enclosure is constructed in spanning relation between the room and the photographic printer so as to provide communication therebetween under light-controlled conditions. To this operating environment is added a supply of said photographic paper put up in a supply roll of a selected large-sized diameter, the specific location thereof being in said room. The paper is fed from this giant roll through the tunnel directly into the photographic printer. The handling of the paper feed, as just described, contributes to significantly prolonging the duration of operation of the photographic printer between paper spool changes. It also contributes to maintaining standard sizes of rolls of completed work, and more effectively harmonizes the paper consumption to the size of the negative rolls used for printing the originals.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein.

Figure 1:
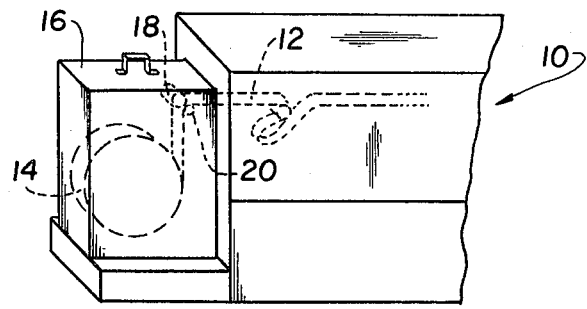
FIG. 1 is a perspective view illustrating the current prior art practice of feeding light-sensitive development paper into a photographic printer.

FIG. 1, which is exemplary of prior art practice, is intended to illustrate a photographic printer, generally designated 10, which is of the type similar to the Agfa 7560 high speed printer as referred to in U.S. Pat. No. 4,147,427 (column 1, at lines 25, 26) or the equivalent. As understood, the operation of printer 10 comtemplates production of color or black and white prints or transparencies of photographic film originals onto photosensitive print medium in the specific form of a strip of development paper 12 put up as a supply roll 14 that is fed from a cartridge 16 to the printing station of the printer 10. As both generally understood, illustrated and described in said referred to U.S. Pat. No. 4,147,427, the supply roll 14 of the development paper is wound about a spool appropriately journalled for rotation within the cartridge 16, and the feeding therefrom into the printer 10 is achieved using feed rollers 18 and 20 to unwind and urge the strip 12 through movement from the cartridge into the printer at an appropriate rate of speed. Currently, the Agfa 7560 printer intended to be exemplified by printer 10 of FIG. 1, achieves printing at a rate which consumes a 500 meter-long development paper strip 12 in approximately ten minutes of operation. Moreover, it is not uncommon for ten minutes to be consumed in making an operative attachment to a new cartridge 16 containing a fresh supply spool 14 of the paper. As a consequence, the advantages of the high speed of operation of available photographic printers is significantly lost by virtue of the need to replenish the development paper supply every ten minutes with a procedure which entails a ten minute down-time period for the printer. Additionally, since the printer 10 also utilizes spools of 500 meter-long strips of photographic film originals, such spools also have to be replaced from time to time with attendant down-time for the printer. While the within invention has no direct effect on this aspect of the operation of the printer 10, it does have a significant impact on minimizing the down-time due to replenishment of the development paper and to an extent therefore obviates, for all practical purposes, any down-time for the printer other than for adding new reels or spools of film. An indirect advantageous effect, however, that it has is in better harmonizing the match-up of paper and film. As subsequently to be described, the paper source according to the invention is increased from 500 to approximately 3000 meters-long, and there are therefore few instances when the paper supply is exhausted while there is still some film strip on its supply spool requiring processing. This, in turn, obviates the need for coding the fresh paper as a continuation of completed work so that proper logistics are maintained for assuring that the completed work is returned to the proper customer.

Figure 2:
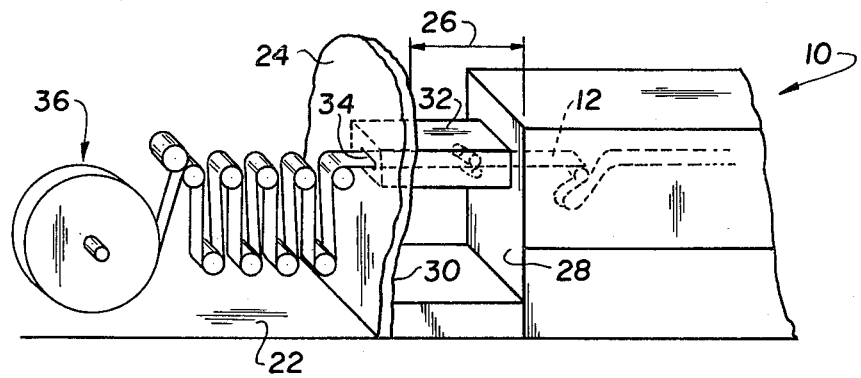
FIG. 2 is a perspective view illustrating improvements in the operation as well as in the operational environment of said photographic printer as related specifically to the feeding of development paper to same.

Referring now to FIG. 2, let it be assumed that the invention is applied to an Agfa 7560 high speed printer, as exemplified by printer 10, or its equivalent. The within invention contemplates that there will be available at the site where the printer 10 is used, a light-controlled area or dark room 22 bounded by walls, such as wall 24, which delineate the area 22. Printer 10 is provided with a strategic location in proximate external relation to the dark room wall 24 so that there is an optimum distance 26 of only a foot or so therebetween. Connected in spanning relation across the distance 26 between a side 28 of the printer 10 and the external surface 30 of wall 24 is a hollow tunnel-like enclosure 32. At opposite ends of tunnel 32 are appropriate openings, as exemplified by the one illustrated end opening 34, which provide communication, under light-controlled conditions, between the dark room area 22 and the printing station located internally of the housing of printer 10. Thus, the supply length of the development paper strip 12 is effectively fed from the light-controlled environment of dark room 22 through the tunnel enclosure 32 directly into the printing station of the printer 10.

In accordance with the present invention, the operating environment for the printer 10 as just described is used to advantage by having the development paper strip put up as a supply roll, generally designated 36, within the dark room 22 and being of a selected greatly increased diameter, which in a preferred embodiment is approximately 54 inches. It should be readily recognized that a supply spool 36 of paper of such size and weight could not be handled on a practical basis by being attached directly to the printer 10, i.e. as a source of supply within an attachable cartridge 16, as explained in connection with the prior art practice of FIG. 1. Rather, the large-sized supply spool 36 requires independent handling, and such handling is provided in accordance with the present invention in the separate dark room area 22.

Figure 3:
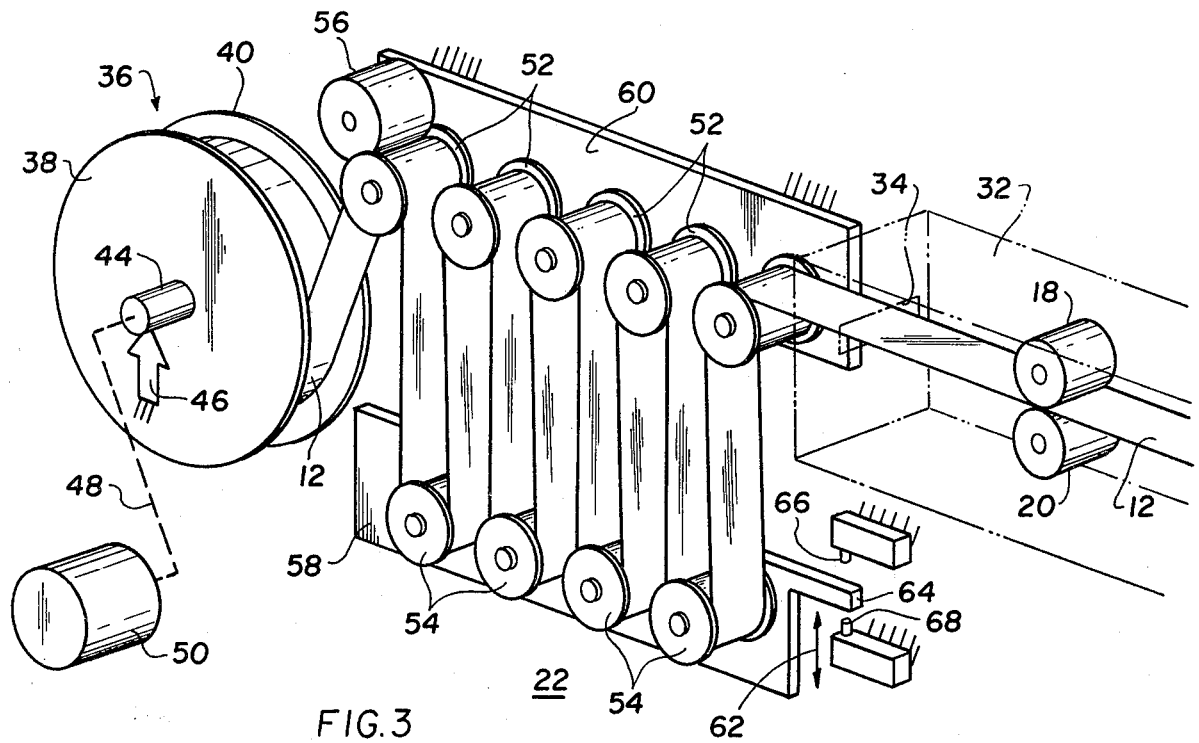
FIG. 3 is a perspective view illustrating further details of the manner in which the development paper is fed to the photographic printer.

Reference should now be made to FIG. 3 illustrating a preferred manner in which the large-sized supply roll 36 of development paper is operatively arranged for feeding from the dark room area 22 through the tunnel 32 into the printer 10. The 54 inch diameter of paper strip 12, which is the initial condition for the supply roll 36, is helically wound about a core mounted between two discs 38 and 40, such structure having a central rotation axis in the form of a laterally extending horizontally oriented shaft 44. As a result, the supply roll 36 is readily journalled for rotation on bearing supports 46 and is operatively arranged, via closed loop chain or other such connection 48, to be intermittently powered in rotation by a motor 50.

To provide proper feed control of the paper strip 12 to the printer 10, the strip is threaded about a series of upper rollers, individually and collectively designated 52, and lower rollers, individually and collectively designated 54. To assist motor 50 in unwinding the paper strip 12 from the supply roll 36, as will be subsequently described, the same prior art power feed rollers 18 and 20 may be advantageously utilized in the tunnel 32, and an additional power feed roller 56 utilized at the location illustrated in FIG. 3.

Intermittent operation of motor 50 which, as noted, causes unwinding rotation of the supply roll 36, is a function of the position of a movable member 58 which mounts the lower rollers 58 in relation to the stationary member 60 which mounts the upper rollers 52. Under the operating conditions depicted in FIG. 3 motor 50 is not operated, and supply roll 36 is therefore stationary. At this time printer 10, however, is operating and therefore consuming lengths of the paper strip 12 that is being urged into the printer 10 by rotation of the power feed rollers 18 and 20. This consumption of paper draws up on the looped condition of the paper supported on the rollers 52 and 54. Since member 58 mounting the rollers 54 is movable, it ascends from the condition illustrated up along the path 62. Ultimately a contact or projection 64 of member 58 contacts and operates a switch 66 mounted in the path 62 and this, it will be understood, has the effect of commencing the operation of motor 50 and of power feed roller 56. As a result, an additional length of the paper strip 12 is unwound from the supply spool 36. This occurs at a more rapid rate than that at which the paper is consumed by the printer 10, and thus results in descending movement 62 of the member 58. This descending movement occurs until contact 64 operates switch 68, which it will be understood is electrically connected to the control circuit for the motor 50 so as to terminate the operation thereof as well as that of the power feed roller 56.

From the foregoing it should be readily appreciated that there has been described an effective means for maintaining a high speed photographic printer with a ready supply of the development paper needed for its effective operation without necessitating any objectionable down-time for the printer in order to replenish this rapidly consumed component. This is in sharp contrast to current prior art practice in which, for a typical high speed photographic printer, the paper supply must be replenished approximately every ten minutes and entails a procedure which itself may require ten minutes. While the improvements to a photographic printer resulting in significant facilitated operation thereof as just described is exemplified by the structure illustrated in FIGS. 2 and 3, it will nevertheless be understood that a latitude of modification, change and substitution is intended in the foregoing disclosure, and in some instances some features of the invention will be employed without a corresponding use of other features. Accordingly, it is appropriate that the appended claims be construed broadly and in a manner consistent with the spirit and scope of the invention herein.

What is claimed is:

1. For a photographic printer of the type using light-sensitive development paper, improvements in the operation and operating environment of said printer effective to minimize non-operating periods thereof as are now allowed for replenishment of the supply of said development paper, said improvements comprising wall means bounding a light-controlled room, an operative location for said photographic printer in proximate external relation to said room, a hollow tunnel-like enclosure disposed in spanning relation between said room and said photographic printer effective to provide communication therebetween under light-controlled conditions, and a supply of said photographic paper put up in a supply roll of a selected large-sized diameter operatively arranged in said room for feeding therefrom through said tunnel directly into said photographic printer, to thereby contribute to significantly prolonging the duration of operation of said photographic printer without requiring replenishment of the development paper being supplied thereto.

2. The improved cooperating operational arrangement of a photographic printer and development paper supply roll as claimed in claim 1, wherein said size for said supply roll is selected to exceed what can be effectively supported on said photographic printer, and wherein an independent support is provided in said room for said selected large-sized supply roll and a motor is operatively connected to intermittently power said supply roll in rotation incident to the feeding unwinding of said development paper from said supply roll.

3. The improved cooperating operational arrangement of a photographic printer and development paper supply roll as claimed in claim 2, including an operative arrangement of upper and lower spaced apart rollers between said supply roll and said tunnel for supporting a supply length of said development paper in threaded relation thereabout, to thereby facilitate the feeding of said development paper to said printer.

4. The improved cooperating operational arrangement of a photographic printer and development paper supply roll as claimed in claim 3, wherein the diameter of said development paper supply roll is at least 54 inches.

* * * * *